(12) United States Patent
Wieres et al.

(10) Patent No.: US 6,425,517 B1
(45) Date of Patent: Jul. 30, 2002

(54) METHOD FOR APPLYING A BRAZING MEDIUM TO A CONFIGURATION

(75) Inventors: Ludwig Wieres, Overath; Ferdi Kurth, Köln, both of (DE)

(73) Assignee: Emitec Gesellschaft fur Emissionstechnologie mbH, Lohmar (GB)

( * ) Notice: Subject to any disclaimer, the term of this patent is extended or adjusted under 35 U.S.C. 154(b) by 0 days.

(21) Appl. No.: 09/627,236

(22) Filed: Jul. 27, 2000

Related U.S. Application Data

(63) Continuation of application No. PCT/EP99/00391, filed on Jan. 21, 1999.

(30) Foreign Application Priority Data

Jan. 27, 1998 (DE) .......................... 198 03 012
May 22, 1998 (DE) .......................... 198 23 000

(51) Int. Cl.[7] .................. B23K 31/00; B23K 31/02
(52) U.S. Cl. ................. 228/248.1; 228/181; 228/248.5
(58) Field of Search ................ 228/48.1, 248.5, 228/181

(56) References Cited

U.S. PATENT DOCUMENTS 3,769,101 A 10/1973 Woodward
5,431,330 A * 7/1995 Wieres ................. 228/181
5,593,646 A 1/1997 Koshiba et al.
5,648,176 A * 7/1997 Nakagawa et al. ......... 428/593
5,971,255 A * 10/1999 Yamamoto et al. ......... 228/181

FOREIGN PATENT DOCUMENTS

| DE | 29 24 592 A1 | 1/1981 |
| EP | 0 245 738 A1 | 11/1987 |
| EP | 0 474 909 A1 | 3/1992 |
| WO | WO 89/11938 | 12/1989 |
| WO | WO 93/25339 | 12/1993 |
| WO | WO 94/06594 | 3/1994 |
| WO | WO 96/26805 | 9/1996 |

* cited by examiner

*Primary Examiner*—Tom Dunn
*Assistant Examiner*—Zidia Pittman
(74) *Attorney, Agent, or Firm*—Laurence A. Greenberg; Werner H. Stemer; Gregory L. Mayback

(57) ABSTRACT

A method for applying a brazing medium to a configuration, which includes a honeycomb body and a jacket pipe, is described. First, the honeycomb body is formed by stacking and/or winding of sheet metal layers. At least some of which are structured sheet metal layers, such that the honeycomb body has channels for conducting a fluid flow. The honeycomb body is introduced into the jacket pipe. At least one end face of the honeycomb body is brought into contact with a roller having an adhesive medium disposed thereon, and the roller is mounted rotatably about a roller axle. The configuration and the roller are moved relative to one another such that the roller deposits the adhesive medium onto the honeycomb body. Subsequently, a brazing medium is introduced at least into the honeycomb body.

18 Claims, 3 Drawing Sheets

METHOD FOR APPLYING A BRAZING MEDIUM TO A CONFIGURATION

CROSS-REFERENCE TO RELATED APPLICATION

This is a continuation of copending International Application PCT/EP99/00391, filed Jan. 21, 1999, which designated the United States.

BACKGROUND OF THE INVENTION

Field of the Invention

The present invention relates to a method for applying a brazing medium to a configuration that includes a honeycomb body disposed in a jacket pipe.

Honeycomb bodies that are made by stacking and/or winding sheet metal layers, at least some of which are structured sheet metal layers, are known in many forms. Such honeycomb bodies are used, for example, as supporting bodies for catalytically active coatings and as catalytic converter supporting bodies. In particular for internal combustion engines, as are used, for example, in automotive vehicles, the honeycomb bodies together with the jacket pipe form a part of an exhaust system. Different configurations of a catalytic converter supporting body are described, for example, in Published, European Patent Application EP 0 245 738 A1.

The stacked and/or wound sheet metal layers are at least partially brazed o one to another, so that a monolithic honeycomb body is produced. It is known for the honeycomb body to be at least partially brazed to a jacket pipe in which it is disposed. For this, the brazing medium is introduced into the brazing areas of the sheet metal layers and of the jacket pipe.

Methods for applying an adhesive medium and a brazing medium to a metallic configuration including a honeycomb body and a jacket pipe are known, for example, from International Patent Disclosures WO 89/11938, WO 94/06594, WO 93/25339 and Published, Non-Prosecuted German Patent Application DE 29 24 592 A1.

It is known from the prior art for the honeycomb body to be at least in part provided with an adhesive medium to which a brazing powder adheres. The methods known from the prior art differ with respect to implementation of the method in the sequence of applying the adhesive medium and the brazing powder during or after the formation of the honeycomb. A comprehensive presentation of the prior art is contained in International Patent Disclosure WO 89/11938.

A method is known from Published, European Patent Application EP 0 474 909 A1 for applying the brazing medium to a configuration, in which a honeycomb body is brought into contact with an adhesive medium carrier by an end face. The adhesive medium should be absorbed into th e channels because of capillary action. Published, Non-Prosecuted German Patent Application DE 29 24 592 A1 discloses a method for joining the honeycomb body to the jacket pipe, in which the honeycomb body together with the jacket pipe is immersed in an immersion bath containing an adhesive liquid, and is then provided with a powdered brazing medium.

SUMMARY OF THE INVENTION

It is accordingly an object of the invention to provide a method for applying a brazing medium to a configuration that overcomes the disadvantages of the prior art methods of this general type, which makes possible a uniform introduction of an adhesive into the honeycomb body.

With the foregoing and other objects in view there is provided, in accordance with the invention, a method for applying a brazing medium. The method includes the steps of providing a configuration having a honeycomb body formed by stacking and/or winding sheet metal layers. At least some of the sheet metal layers are structured sheet metal layers, so that the honeycomb body has channels formed therein for conducting a fluid flow. Next, the honeycomb body is partly introduced into a jacket pipe. Then a section of the honeycomb body, the section having an end face projecting out from the jacket pipe, is brought into contact with a roller being rotatable about a roller axle and the roller containing an adhesive medium. A relative movement between the honeycomb body and the roller is implemented. The honeycomb body is further introduced into the jacket pipe, and the brazing medium is introduced at least into the honeycomb body.

In order to apply the brazing medium to the configuration formed of the honeycomb body in the jacket pipe, it is proposed that first the honeycomb body is configured by stacking or winding sheet metal layers. At least some of which are structured sheet metal layers, such that it has channels that can conduct a fluid flow. The honeycomb body is introduced into the jacket pipe. At least one end face of the honeycomb body is brought into contact with the roller containing the adhesive medium, which is rotatable about a roller axle. The honeycomb body and the roller are moved relative to one another such that the roller rolls over at least a part of the end surface of the honeycomb body, and during the rolling procedure deposits the adhesive medium onto the honeycomb body. After this the brazing medium is introduced at least into the honeycomb.

By the implementation of the method according to the invention, a uniform application of the adhesive medium on and respectively in, the honeycomb body is obtained. Possible irregularities in the end face of the honeycomb body, which are caused by an offsetting between the sheet metal layers of the honeycomb body, do not affect the application of the adhesive medium. Because the roller rolls over the end face, the wear on the roller is also reduced as the same places on the roller do not always come into contact with the relatively thin edges of the metal sheets. In this way the lifetime of an apparatus suitable for implementing the method is also increased.

The honeycomb body and the roller can be moved for the application of the adhesive medium. In this way a rapid application of the adhesive medium is obtained when the roller and the honeycomb body are moved in a translatory manner in opposite directions. To simplify the method it is proposed that either the honeycomb body or the roller is positioned in a stationary manner and the roller, or respectively the honeycomb body, is moved.

In the case of a honeycomb body which has at least one end area projecting from the jacket pipe, configured rotationally symmetrical with respect to a longitudinal axis of the honeycomb body, it is proposed that the honeycomb body is rotated about its longitudinal axis. And the roller, which has a shape matching the end area, and extends radially inwards only as far as the longitudinal axis, about a roller axle intersecting the longitudinal axis at an angle of 90°. By this method, the roller is brought into contact with the surface of the projecting end area.

The end face of the honeycomb body can be brought into contact with the roller several times. It is advantageous when prior to renewed contacting with the roller, the honeycomb body is tilted by a pre-determined angle about the longitudinal axis. In this way the roller brushes several times over the end face of honeycomb body, so that a very uniform application of the adhesive medium is obtained.

In particular instances of applications, it is not necessary for all the sheet metal layers of the honeycomb body to be provided with the adhesive medium. In order to apply the adhesive medium only in some areas of the end face of the honeycomb body, it is proposed that the roller is only provided in some areas with the adhesive medium. This can be done, for example, by suitable configuration of the roller. By this method, the interpositioning of, for example, gluing masks, is not necessary.

According to a further advantageous configuration of the method according to the invention, it is proposed that the honeycomb body is disposed substantially vertically and that the roller is brought into contact with an upper end face of the honeycomb body. By the relative movement between the honeycomb body and the roller, dripping of the adhesive medium into the honeycomb body does not occur.

In particular when a low viscosity adhesive medium is used, it is advantageous to dispose the honeycomb body substantially vertically and to bring the rollers into contact with a lower end face of the honeycomb body, whereby dripping of the adhesive medium into the honeycomb body is prevented.

According to yet another advantageous configuration of the method, it is proposed that the honeycomb body, which has two opposite end faces, is passed between two rotatably mounted rollers, spaced apart, so both the end faces are wetted with the adhesive medium at substantially the same time.

The configuration which is formed of the honeycomb body disposed in the jacket pipe can also be configured such that the jacket pipe, at least in one edge section, projects over the honeycomb body. In other words, the honeycomb body is disposed in the jacket pipe such that at least one end face of the honeycomb body is spaced apart from the adjacent end face of the jacket pipe.

Such projecting edge sections of the jacket pipe form connecting areas so the configuration can be connected to other components or elements. Thus, for example, when such a configuration is used in an exhaust system, a diffuser can be provided on one connecting area of the jacket pipe, which, for example, is connected to an exhaust pipe of an exhaust system of an internal combustion engine. It is also known for the jacket pipe to have two connecting areas that are configured on the respective ends of the jacket pipe, wherein there is substantially no honeycomb body in the connecting areas.

If the method known, for example, from Published, Non-Prosecuted German Patent Application DE 29 24 592 A1 is used for joining the honeycomb body to the jacket pipe, in which the honeycomb body together with the jacket pipe is immersed in a bath containing an adhesive liquid and is subsequently provided with a powdered brazing medium, the connecting areas of the jacket pipe are also provided with the brazing medium, without this being necessary or desired. The connecting areas are not only provided with the adhesive medium on an inside surface of the jacket pipe, but also on an outside surface of the jacket pipe. This is undesirable, as it leads to spreading of the adhesive medium. In particular, the manipulating tools that engage with an outside surface of the jacket pipe are brought into contact with the adhesive medium. Considerable costs for cleaning the manipulating tools are sometimes necessary.

The methods also described in Published, Non-Prosecuted German Patent Application DE 29 24 592 A1 are basically suitable for applying the brazing medium to the jacket pipe and to the honeycomb body, wherein these methods for applying the brazing medium are relatively costly.

In order to apply the brazing medium to a configuration which is formed of the honeycomb body and the jacket pipe, it is proposed in a further advantageous feature of the method that the honeycomb body is first constructed by stacking and/or winding sheet metal layers. At least some of which are structured sheet metal layers, such that it has channels that can conduct a fluid flow. The honeycomb body is partially inserted into the jacket pipe. The section of the honeycomb body projecting from the jacket pipe is brought into contact, with its end face, with a roller containing the adhesive medium. Afterwards the honeycomb body is introduced into the jacket pipe and the brazing medium is introduced into the honeycomb body.

Because only the section of the honeycomb body projecting out of the jacket pipe is brought into contact with the adhesive medium, the jacket pipe is prevented from also coming into contact with the adhesive medium. In this way, the jacket pipe is free of the adhesive medium, whereby the brazing powder does not adhere to the jacket pipe.

Because the jacket pipe is not provided with the adhesive medium, it is unnecessary to optionally free the jacket pipe from the adhesive medium in order to prevent the spreading of the adhesive medium.

Because the section projecting from the jacket pipe is brought into contact with the adhesive medium, whereby the honeycomb body is at least in part provided in its axial direction with the adhesive medium, the honeycomb body is also provided with the adhesive medium over its entire cross-sectional surface. Therefore, even edge areas of the honeycomb body can be provided with a brazing powder without any problems. In this way it is guaranteed that a reliable brazed joint can be configured even in the edge area of the honeycomb body and respectively between the honeycomb body and the jacket pipe.

According to a further advantageous feature of the method, it is proposed that prior to the application of the brazing medium, a section of the honeycomb body opposite the section is brought into contact with the adhesive medium. In particular with a configuration which has the jacket pipe, wherein the jacket pipe has a connecting area on each of its opposite ends, it is proposed that the honeycomb body is pushed through the jacket pipe so that one section projects out of the jacket pipe. This section is brought into contact with the adhesive medium. After this the honeycomb body is introduced into the jacket pipe such that the honeycomb body does not substantially lie in the connecting areas of the jacket pipe.

For stable handling of the configuration, it is proposed that the honeycomb body is introduced into the jacket pipe such that while one or the other section is brought into contact with the adhesive medium, the honeycomb body is located, over a substantial part of its axial length, in the jacket pipe. In this way, the configuration has an advantageously positioned center of gravity that prevents the configuration toppling over.

In particular it is proposed that the honeycomb body is introduced into the jacket pipe such that it projects at least 1 mm, preferably 5 mm, out of the jacket pipe. This extent is sufficient to prevent the jacket pipe from also coming into contact with the adhesive medium.

The honeycomb body and the jacket pipe have different thermal expansion behavior. It has therefore been sought to avoid having a rigid connection between the respective end areas of the honeycomb body. If there are no rigid connections in the respective end areas of the honeycomb body with the jacket pipe, thermal stresses between the jacket pipe and the honeycomb body are avoided. It is already known from International Patent is closure WO 96/26805 how such thermal stresses can be avoided by suitable brazing of the honeycomb body to the jacket pipe.

According to an advantageous feature of the method according to the invention, thermal stresses between the honeycomb body and the jacket pipe are avoided by introducing a sleeve-shaped element into in the jacket pipe. The sleeve-shaped element has an outside jacket which comes substantially into contact with a part of the inside jacket surface of the jacket pipe, and in which the honeycomb body is disposed. Brazing of the honeycomb body to the jacket pipe is prevented by the sleeve-shaped element. The sleeve-shaped element just extends over a part of the axial extent of the jacket pipe and of the honeycomb body. The sleeve-shaped element is preferably formed by a foil.

Because of manufacturing technology, the jacket pipe is somewhat out-of-round. There are also tolerances with respect to the variations of an internal diameter of the jacket pipe. Due to this, a gap forms between an inside jacket surface of the jacket pipe and the element. Because the honeycomb body is brought into contact with the adhesive medium when projecting out of the jacket pipe, the adhesive medium is prevented from getting into the gap between the element and the jacket pipe, so this gap also remains substantially free of the brazing medium after the brazing medium is applied. In this way it is also ensured that there is no brazed connection between the jacket pipe and the sleeve-shaped element. On the other hand, it is also ensured that the honeycomb body can also be brazed as far as the sleeve-shaped element and also to the sleeve-shaped element.

Preferably, the sleeve-shaped element is connected to the jacket pipe such that when the honeycomb body is introduced in the jacket pipe. The sleeve-shaped element stays in a pre-determined position even though the honeycomb body, which is pressed in the axial direction and as a consequence the sleeve-shaped element also is, and because of this exerts a force upon the sleeve-shaped element in the direction of insertion of the honeycomb body. In particular it is proposed that the element is materially joined to the jacket pipe. This can, for example, be a welded connection. Alternatively, or in addition, the element can be glued to the jacket pipe. The connection between the sleeve-shaped element and the jacket pipe is preferably made such that the strength of the connection is less than the strength of a connection between the element and the honeycomb body. In particular with an adhesive bonding of the element and the jacket pipe, this can be increased during a brazing process because of the temperatures prevailing during the brazing process. Because the connection between the element and the jacket pipe is less strong than the connection between the element and the honeycomb body, it is also ensured that thermal stresses between the jacket pipe and the honeycomb body are not conducted by the element into the honeycomb body. Preferably, the element is manufactured from the same material as the honeycomb body and/or the jacket pipe. The connection between the element and the jacket pipe is substantially an assembly connection by which it is ensured that during assembly, that is to say during introduction of the honeycomb body in the jacket pipe, the element does not change its position.

In order to braze the honeycomb body in an axial portion of the jacket pipe and with the sleeve-shaped element, it is proposed that at least one brazing section be configured which overlaps the honeycomb body and the element. This is preferably a brazing section closed when viewed in the direction of the periphery of the jacket pipe.

Other features which are considered as characteristic for the invention are set forth in the appended claims.

Although the invention is illustrated and described herein as embodied in a method for applying a brazing medium to a configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
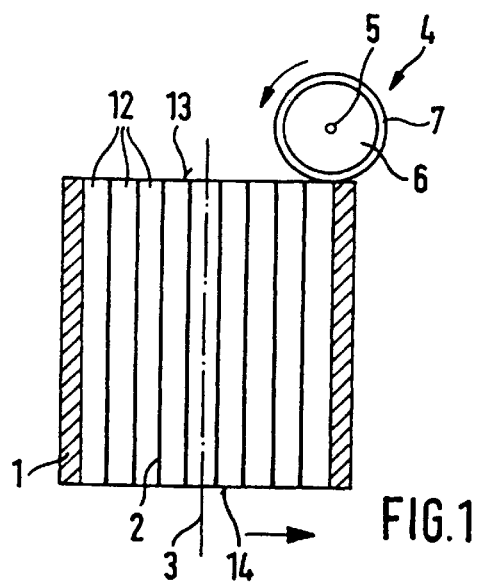
FIG. 1 is a diagrammatic, sectional view of a configuration with a roller according to the invention.

In all the figures of the drawing, sub-features and integral parts that correspond to one another bear the same reference symbol in each case. Referring now to the figures of the drawing in detail and first, particularly, to FIG. 1 thereof, there is shown, in section, a jacket pipe 1, in which there is a metallic honeycomb body 2, which is formed by stacking and/or winding of sheet metal layers, at least some of which are structured. The honeycomb body 2 is provided with channels 12 extending in a longitudinal direction of the honeycomb body 2.

The honeycomb body is disposed substantially vertically. It has two opposite end faces 13, 14.

The jacket pipe 1 together with the honeycomb body 2 forms a configuration. A roller 4 is disposed above the configuration. The roller 4 is rotatably mounted about a roller axle 5. The roller 4 has a core 6 upon which a substrate 7 is configured that contains an adhesive medium.

The application of the adhesive medium by the roller 4 into the end faces 13 of the honeycomb body 2 is done by a relative movement between the honeycomb body 2 and the roller 4.

The honeycomb body 2 is moved corresponding to the arrow shown in FIG. 1, whereby the roller 4 in contact with the end face 13 is offset in its rotation about the roller axle 5. During this rotation, the substrate 7 with the adhesive medium comes into contact with the end face 13, and the adhesive medium flows into the end face 13 of the honeycomb body 2.

The roller 4 can also be driven. By control of the contact pressure between the roller 4 and the configuration, the amount of the adhesive medium dispensed can be controlled. This can also be controlled by a speed of the relative movement between the honeycomb body 2 and the roller 4.

Figure 2:
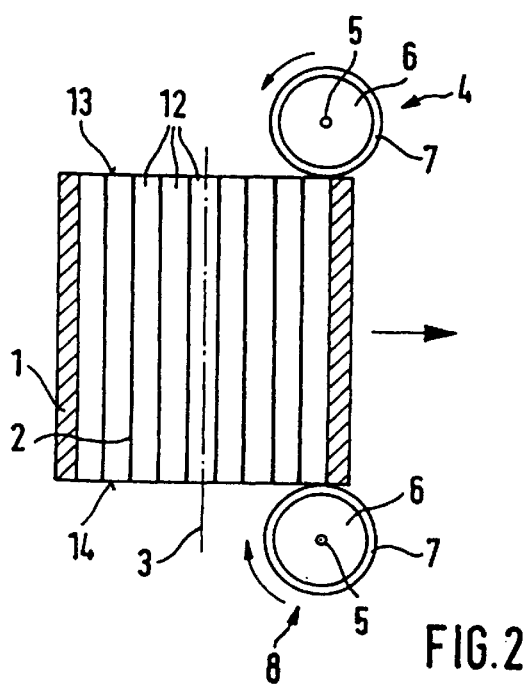
FIG. 2 is a sectional view of the configuration between two rollers.

In FIG. 2 there is shown a configuration that corresponds to the configuration shown in FIG. 1. The configuration is moveable between two rollers 4, 8, so that the opposite end faces 13, 14 are provided simultaneously with the adhesive medium. The amount of the adhesive medium that the rollers 4, 8 dispense can be the same or different. The rollers 4 and respectively 8, can also be configured such that there are sections, viewed in an axial direction of the rollers 4 and respectively 8, which have no substrate 7 so that a striped application of the adhesive medium is possible.

Figure 3:
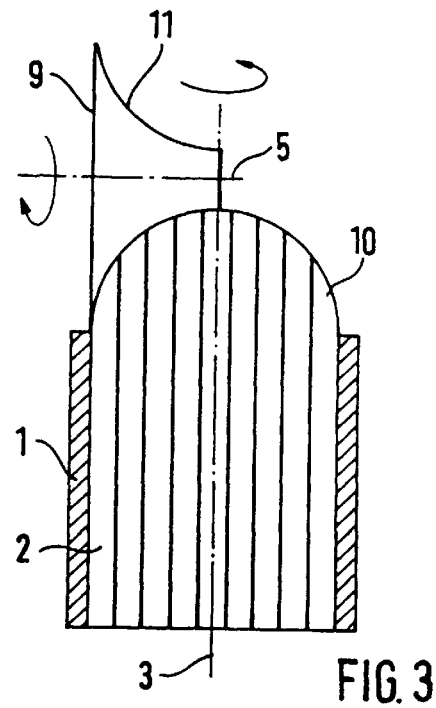
FIG. 3 is a sectional view of the configuration with an end area projecting from a jacket pipe and the roller.

In FIG. 3 the honeycomb body 2 is shown which is disposed in the jacket pipe 1. The honeycomb body 2 has an end area 10 configured rotationally symmetrical with respect to a longitudinal axis 3. A roller 9 has a profile 11 matched to the end area 10.

For application of the adhesive medium, the roller 9 lies on the end area 10. The roller 9 is disposed such that the roller axle 5 and the longitudinal axis 3 intersect at an angle of approximately 90°. The honeycomb body 2 together with the jacket 1 is rotated about the axis 3 so that the roller 9 comes into contact with the surface of the end area 10. Alternatively, the configuration, containing the jacket pipe 1 and the honeycomb body 2 can also be disposed in a stationary manner. In this case, the roller 9 is offset in a rotational movement about the axle 5 and about the longitudinal axis 3. It is also possible to move both the configuration and the roller.

Figure 4:
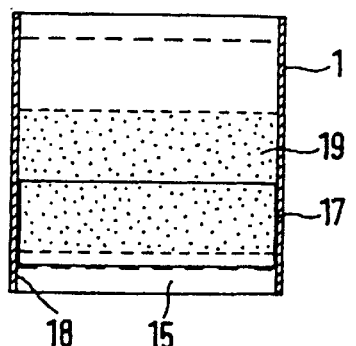
FIG. 4 is a sectional view of the jacket pipe with an element is and a brazing section.

FIG. 4 shows the jacket pipe 1 in section. The jacket pipe 1 preferably has a substantially circular cross-section. On one end section of the jacket pipe 1, a connecting area 15 is configured. The connecting area 15 is identified by the broken line. The connecting area 15 is provided for connecting the configuration to a further component that is not shown. In particular, the connecting area 15 can be connected to a component of an exhaust system of an internal combustion engine.

A sleeve-shaped element 17 is introduced into the jacket pipe 1. The sleeve-shaped element 17 has an outside jacket 16 that comes substantially into contact with a part of an inside jacket surface 10 of the jacket pipe 1, as can be seen in particular in FIG. 9. The sleeve-shaped element 17 is preferably configured in an annular manner viewed in the direction of the periphery. As can be seen from FIG. 4 and in particular from FIG. 9, the sleeve-shaped element 17 extends over a part of the axial extent of the jacket pipe 1. The axial extent of the sleeve-shaped element 17 is smaller than the axial extent of the honeycomb body 2.

Figure 9:
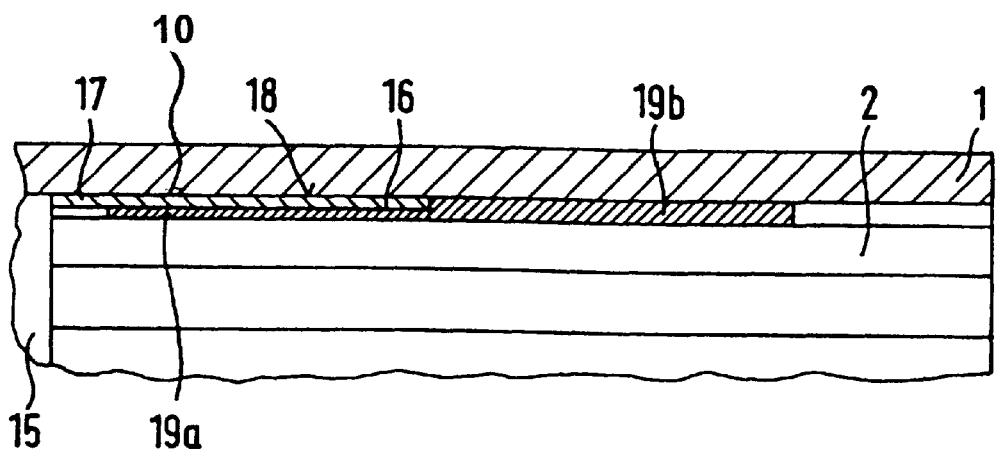
FIG. 9 is an enlarged, sectional view of an edge area of the configuration.

The sleeve-shaped element 17 is connected to the jacket pipe 1. A brazing section is labeled with the reference numeral 19, which partly overlaps the jacket pipe 1 and the sleeve-shaped element 17. The brazing section 19 has a first section 19a, which substantially corresponds to the axial extent of the element 17. The first section 19a is connected to a second section 19b (FIG. 9).

Due to the first section 19a of the brazing section 19, a brazed connection between the honeycomb body 2 and the element 17 takes place. Due to the second section 19b the honeycomb body 2 is connected to the jacket pipe 1. At least the axial extent of the element 17 forms a compensating segment by which the different thermal expansions of the jacket pipe 1 and the honeycomb body 2 can be compensated for.

Figure 5:
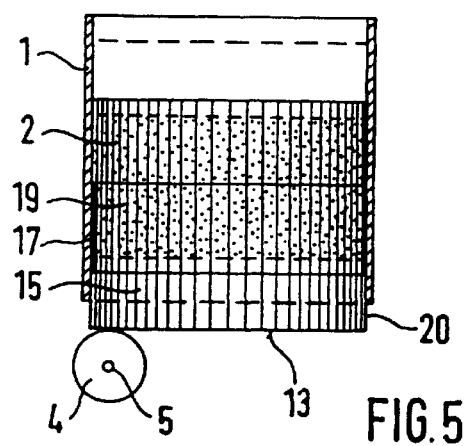
FIG. 5 is a sectional view of the configuration during an application of an adhesive medium.

The honeycomb body 2 is introduced into the jacket pipe 1 with the sleeve-shaped element 17. The honeycomb body 2 is introduced into the jacket pipe 1 such that a section 20 projects out of the jacket pipe 1, as can be seen from FIG. 5. The section 20 of the honeycomb body 2 is brought into contact with the adhesive medium, in particular a liquid adhesive. The liquid adhesive is made available in the roller 4. Wetting of the honeycomb body 2 is done from the end face in the axial direction of the honeycomb body 2. The roller 4 is configured so that wetting with the adhesive medium over the entire end face 13 of the honeycomb body 2 is possible.

Figure 6:
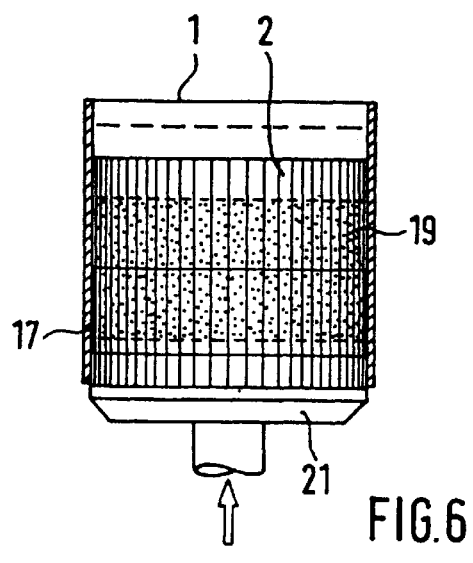
FIG. 6 is a sectional view of the introduction of the honeycomb body in the jacket pipe after an application of the adhesive medium.
Figure 8:
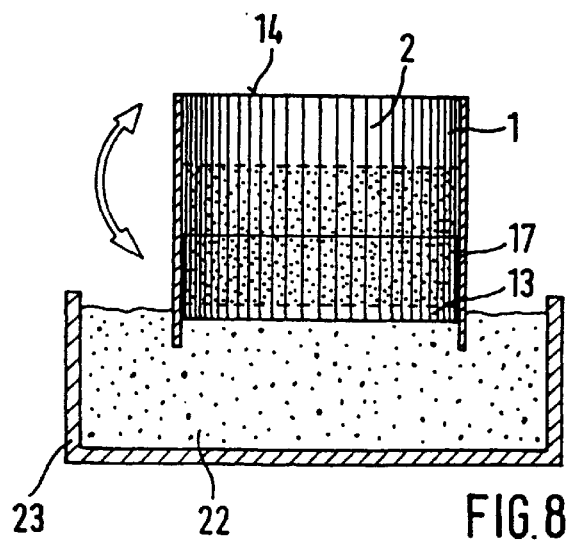
FIG. 8 is a sectional view of an application of a brazing medium in the honeycomb body.

Once sufficient wetting of the honeycomb body 2 with the adhesive liquid is done, the honeycomb body 2 is further introduced into the jacket pipe 1. The introduction of the honeycomb body 2 is preferably done by a stamp 21 by which a force is exerted in the axial direction of the jacket pipe 1 upon the honeycomb body 2 (FIG. 6). A suitable pressure pad engages with the jacket pipe 1, which is not shown, and by which the jacket pipe 1 is held.

Figure 7:
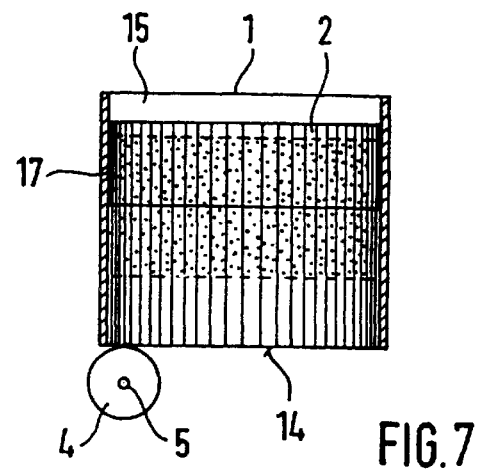
FIG. 7 is a sectional view of an application of the adhesive medium on a second section of the honeycomb body.

FIG. 7 shows that prior to the introduction of the brazing medium, the end face 14 of the honeycomb body 2 opposite the end face 13 is brought into contact with the adhesive medium. The adhesive medium is made available by the roller 4.

After the end face 14 has been provided with the adhesive medium, a brazing powder 22 is introduced into the honeycomb body 2. The procedure of introducing the brazing medium into the honeycomb body 2 is done such that the honeycomb body 2 is pressed by its end face into the brazing powder 22. Subsequently the honeycomb body 2 together with the jacket pipe 1 is reversed and the opposite end face is pressed into the brazing powder 22. The brazing powder 22 is made available in a container 23.

Figure 10:
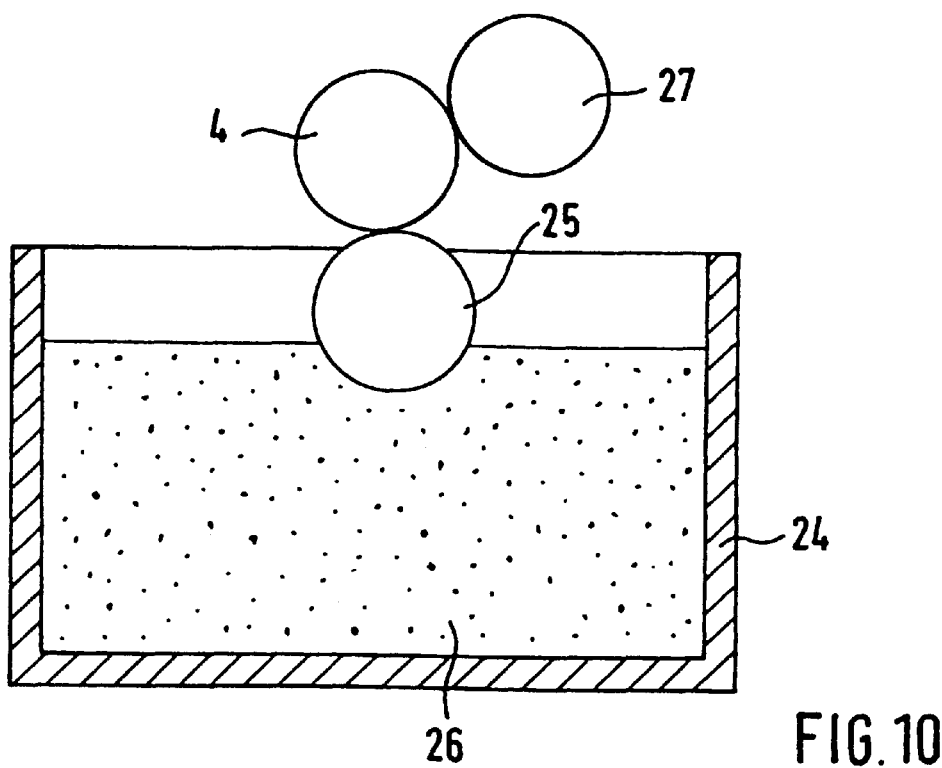
FIG. 10 is a sectional view of an application point.

FIG. 10 shows an application point by which the adhesive medium 26 is applied to the roller 4 from an adhesive medium container 24 by an application roller 25.

The application roller 25 is configured substantially horizontally. It is rotatably mounted. It projects in part into the adhesive medium 26. The surface of the application roller 25 is configured such that it takes the adhesive medium 26 out of the adhesive medium container 24, and transfers it to the roller 4 which is in contact with the application roller. A scraper roller 27, which lies against the roller 4, is provided for scraping off an excess amount of the adhesive medium 26.

We claim:

1. A method for applying a brazing medium, which comprises the steps of:
   providing a configuration having a honeycomb body formed by at least one of stacking and winding sheet metal layers, at least some of the sheet metal layers are structured sheet metal layers, so that the honeycomb body has channels formed therein for conducting a fluid flow;
   partly introducing the honeycomb body into a jacket pipe;
   bringing a section of the honeycomb body, the section having an end face projecting out from the jacket pipe, into contact with a roller being rotatable about a roller axle and the roller containing an adhesive medium;

implementing a relative movement between the honeycomb body and the roller;

introducing the honeycomb body further into the jacket pipe; and introducing the brazing medium at least into the honeycomb body.

2. The method according to claim 1, which comprises positioning the honeycomb body in a stationary manner, and moving the roller.

3. The method according to claim 1, which comprises positioning the roller in a stationary manner, and moving the honeycomb body.

4. The method according to claim 1, which comprises configuring the end face of the section of the honeycomb body projecting from the jacket pipe rotationally symmetrical with respect to a longitudinal axis of the honeycomb body, wherein the honeycomb body is rotated about the longitudinal axis, and the roller having a shape matching the end face and extends radially inwards as far as the longitudinal axis of the honeycomb body is rotated about the roller axle which intersects the longitudinal axis at an angle of approximately 90°.

5. The method according to claim 1, which comprises applying the adhesive medium on the roller on only some areas of the roller.

6. The method according to claim 1, which comprises disposing the honeycomb body substantially vertically and bring the roller into contact with an upper end face of the honeycomb body.

7. The method according to claim 1, which comprises disposing the honeycomb body substantially vertically and bring the roller into contact with a lower end face of the honeycomb body.

8. The method according to claim 1, which comprises providing the honeycomb body with two opposite end faces, and introducing the honeycomb body between two, spaced apart, rotatably mounted rollers so that the two opposite end faces are at least wetted substantially simultaneously with the adhesive medium.

9. The method according to claim 8, which comprises prior to the introducing of the brazing medium, bringing a further section of the honeycomb body opposite the section into contact with the adhesive medium.

10. The method according to claim 9, which comprises pushing the honeycomb body through the jacket pipe such that the further section projects from the jacket pipe.

11. The method according to claim 10, which comprises introducing the honeycomb body into the jacket pipe such that while one of the section and the further section is brought into contact with the adhesive medium, the honeycomb body is introduced into the jacket pipe such that it is located, over a substantial part of its axial length, in the jacket pipe.

12. The method according to claim 11, which comprises introducing the honeycomb body into the jacket pipe such that the honeycomb body projects out by at least 1 mm from the jacket pipe.

13. The method according to claim 1, which comprises introducing a sleeve-shaped element into the jacket pipe, the sleeve-shaped element having an outside jacket which substantially comes into contact with a part of an inside jacket surface of the jacket pipe.

14. The method according to claim 13, which comprises connecting the sleeve-shaped element to the jacket pipe.

15. The method according to claim 14, which comprises materially connecting the sleeve-shaped element to the jacket pipe.

16. The method according to claim 15, which comprises gluing the sleeve-shaped element to the jacket pipe.

17. The method according to claim 13, which comprises providing the configuration with at least one brazing section which overlaps the jacket pipe and the sleeve-shaped element.

18. The method according to claim 11, which comprises introducing the honeycomb body into the jacket pipe such that the honeycomb body projects out by at least 5 mm from the jacket pipe.

* * * * *